(No Model.)
C. T. CUMMINS.
WHEEL.
No. 455,277. Patented June 30, 1891.
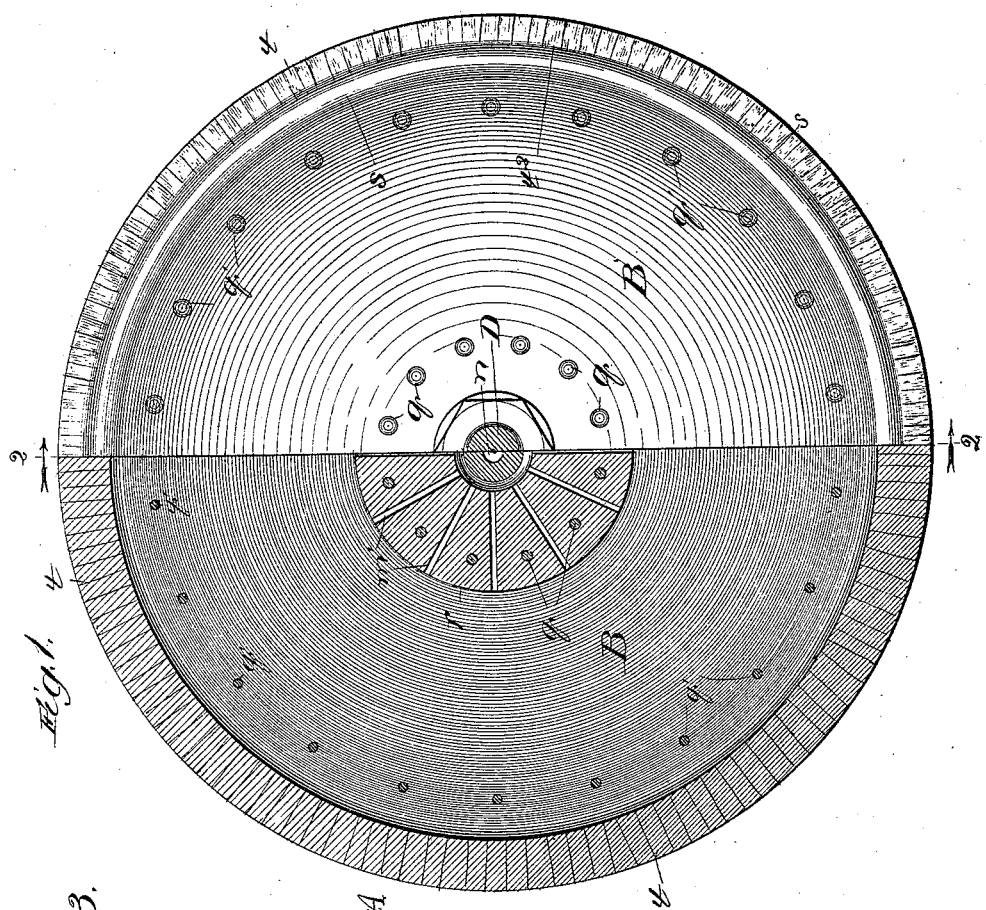
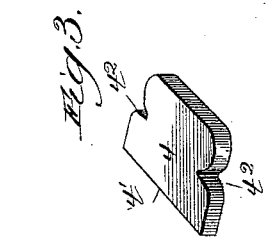
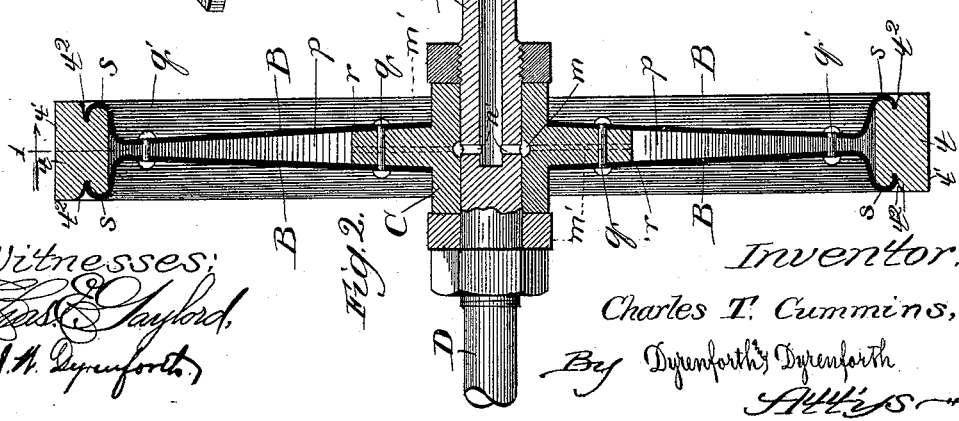
Witnesses:
Inventor:
Charles T. Cummins,
By Dyrenforth & Dyrenforth
Attys.

UNITED STATES PATENT OFFICE.

CHARLES T. CUMMINS, OF CHICAGO, ILLINOIS, ASSIGNOR, BY DIRECT AND MESNE ASSIGNMENTS, TO THE COMPRESS WHEEL COMPANY, OF SAME PLACE.

WHEEL.

SPECIFICATION forming part of Letters Patent No. 455,277, dated June 30, 1891.

Application filed December 2, 1890. Serial No. 373,334. (No model.)

*To all whom it may concern:*

Be it known that I, CHARLES T. CUMMINS, a citizen of the United States, residing at Chicago, in the county of Cook and State of Illinois, have invented a new and useful Improvement in Wheels, of which the following is a specification.

My invention relates to improvements in tires or rims for wheels generally, though my object is more particularly to provide a rim of an improved construction for buffing-wheels. I do not, however, wish to be understood as limiting my improvement to any particular application, since it is also applicable to wheels other than those of the class mentioned and to the various descriptions of wheels.

In the drawings, Figure 1 is a view of a buffing-wheel embodying my improvements, the view being in part a side elevation of the wheel and in part a section thereof, taken on line 1 of Fig. 2 and viewed in the direction of the arrow; Fig. 2, a view in cross-section of the wheel, taken on line 2 2 of Fig. 1 and viewed in the direction of the arrows; and Fig. 3, an enlarged perspective view of one of the sections of the material forming the rim.

A is the rim of the wheel, which is composed of a number of sections $t$ of uniform size in outline, though not necessarily of the same thickness, placed side by side in a circle of which the edges $t'$ of the sections shall form the outer periphery, and compressed together to afford a substantially continuous body. Each section $t$ is provided on opposite ends with notches $t^2$, which in all the sections are alike in size and relative position, so that when the sections are placed side by side in a circle, as described, the notches of the sections will afford continuous grooves in opposite sides of the rim. The ends of the sections between the notches and inner edges are preferably rounded, as shown.

B B are annular retaining and supporting plates affording the wheel center, which may be of the form illustrated, with central openings to fit around a hub and flanges $s$ around their outer edges to conform to the rounded parts of the sides and fit into the grooves $t^2$ of the rim over the rounded annular shoulders thereof. The hub C of the wheel shown has a central annular flange $r$, against opposite sides of which the plates rest. The plates B are secured together at short intervals through the flange $r$ by rivets $q$, and also at short intervals around their outer edge portions by rivets $q'$. The plates thus secured together are out of contact with each other, leaving an annular space $p$ between them, and they operate by gripping the rim tightly at the groove $t^2$ to hold the sections of the rim with a firmness which will prevent all danger of their being thrown off by the centrifugal force generated in the rotation of the wheel.

The sections $t$ for the rims of buffing-wheels may be of leather, felt, canvas, paper, wood, or any other material desirable for the purpose. In the use of buffing-wheels, the polishing material, as emery, rouge, &c., is usually applied with glue or other adhesive substance, which enters the pores of the rim. When the polishing material has worn off with use and it becomes necessary to replenish the rim, it is also necessary before this can be done to remove from the rim all traces of the adhesive substance previously applied. To do this it has been customary hitherto to place the wheel in a liquid to dissolve the adhesive substance, which is called "washing" the wheel, and is necessarily slow and in a measure unsatisfactory. To render this washing operation more speedy and at the same time more effective, I provide a spindle D for the wheel, having a central longitudinal passage $n$ extending as far as the flange of the hub C, and there intersected by one or more passages $n'$, extending to the periphery of the spindle. Coincident with the passage $n'$ the hub has an annular groove $m$, from which one or more passages $m'$ extend through the hub to the annular space $p$ between the plates B. To wash the wheel, it is rotated at a high speed, and water is poured into the opening $n$ of the spindle. The water is carried by centrifugal force through the passages $n'$ $m'$ to the space $p$ and against the inner side of the rim, the force being so great as to drive the water through the pores of the material composing the rim, washing out in a comparatively short time all foreign particles contained therein.

As before stated, my improved rim is applicable to wheels of the various descriptions. The rim, owing to the nature of its construction, is perfectly balanced, and is desirable, therefore, for fly-wheels and pulleys, the sections $t$, if desired, being of steel or other metal.

Rims constructed in sections, as described, would also afford desirable substitutes for the tires or rim portions of vehicle and car wheels.

What I claim as new, and desire to secure by Letters Patent, is—

1. As a new article of manufacture, a wheel having its rim or tire portion formed of flatwise-abutting sections extending crosswise of the circumference of the rim and provided at opposite ends with shoulders, affording when the sections are adjusted together annular shoulders on the sides of the rim, clamping-plates forming the wheel-center extending over the said shoulders to engage and clamp the sections together and hold them in their relative positions, substantially as described.

2. A wheel comprising in combination the tire formed of sections abutting in the direction about the wheel's circumference and each being of the width of the tire, the hub and clamping-plates, each supported in and extending from the hub and forming the wheel-center, the said plates being provided at their outer edges with inward-projecting jaws, between which the tire-sections are seated and being rigidly secured together between the hub and jaws to clamp the tire-sections between the jaws, and thereby hold them in their relative abutting positions, substantially as described.

3. A buffing-wheel comprising in combination a rim formed of flatwise-abutting sections extending crosswise of the circumference and having recesses in their ends affording annular grooves in the sides of the rim, a hub C, provided with a radially-extending passage $m'$, a spindle D, having a central passage communicating with the passage $m'$, and clamping-plates secured to the hub on opposite sides of the passage $m'$, forming a hollow wheel-center and engaging the sections in the said grooves to secure them in their relative abutting positions, substantially as described.

CHARLES T. CUMMINS.

In presence of—
J. W. DYRENFORTH,
M. J. FROST.